UNITED STATES PATENT OFFICE.

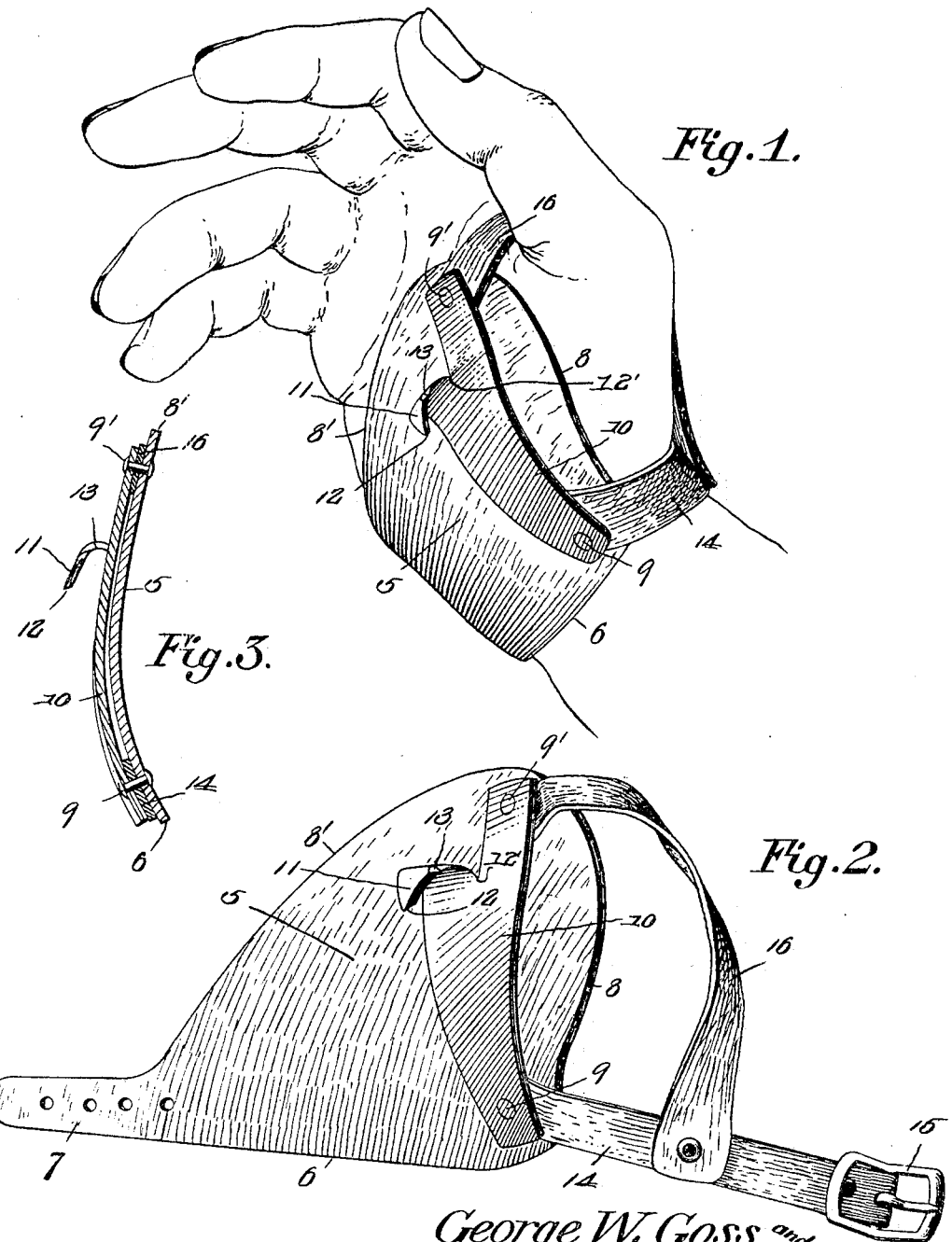

GEORGE W. GOSS AND CHARLES E. GOSS, OF BALTIMORE, OHIO.

CORN-HUSKER.

No. 798,959.  Specification of Letters Patent.  Patented Sept. 5, 1905.

Application filed December 19, 1904. Serial No. 237,529.

*To all whom it may concern:*

Be it known that we, GEORGE W. GOSS and CHARLES E. GOSS, citizens of the United States, residing at Baltimore, in the county of Fairfield and State of Ohio, have invented a new and useful Corn-Husker, of which the following is a specification.

This invention relates to certain improvements in corn-huskers.

The object of the invention is to provide a simple, inexpensive, and efficient device of this character adapted to open the husks more fully, whereby the ear of corn will drop more readily into the hand of the operator.

A further object of the invention is to provide means for cutting or severing the binding twine, cord, or other medium with which the bundles are bound at the time of harvesting.

A still further object is to provide an implement which can be worn with ease and which will leave the thumb of the operator entirely free to grasp the ear of corn in any position without being chafed or cramped.

With these and other objects in view the invention consists in the construction and novel combination and arrangement of parts hereinafter fully described, illustrated in the accompanying drawings, and pointed out in the claims hereto appended, it being understood that various changes in form, proportions, and minor details of construction may be resorted to without departing from the principle or sacrificing any of the advantages of this invention.

In the accompanying drawings, forming a part of this specification, Figure 1 is a perspective view of a corn-husker constructed in accordance with my invention, showing the same applied to the hand of an operator. Fig. 2 is a similar view of the husker detached, and Fig. 3 is a longitudinal sectional view.

Similar numerals of reference indicate corresponding parts in all the figures of the drawings.

The improved device consists of a handpiece 5, preferably formed of leather, canvas, or other pliable material, one edge of which is straight, as indicated at 6, and extended to form a wrist-embracing strap 7, while the opposite edge thereof is curved upwardly from said strap to the rear edge 8 of the handpiece, as shown at 8′.

Secured to the handpiece, as by rivets 9 and 9′, is a metal plate 10, which is curved or bowed longitudinally to arch the palm of the hand at the base of the thumb. One end of the plate 10 is slit or cut longitudinally and the free end of the metal bent rearwardly in substantially parallel relation to the body of said plate to form an overhanging hook or husk-opener 11. The side edges of the bill of the hook are inclined or beveled and preferably terminate in a point 12 to permit the ready insertion of said hook in the husks, as will be readily understood. The inner edge of the hook at its juncture 12′ with plate 10 is sharpened to form a knife 13, which extends from the point 12′ to the smooth side edges of the bill of the hook and is adapted for cutting or severing the twine, cord, or other binding medium with which the bundles of corn are secured or tied at the time of harvesting. By having the cutting edge or knife 13 formed at the juncture of the hook with main body of the plate 10, as shown, a slight lateral movement of the hand is sufficient to sever the cord or twine after the hook has been inserted under or over said cord. The particular location of the knife also renders it almost impossible for the fingers of the operator to come in contact therewith, thereby preventing injury to hand or fingers when the device is in use.

As a means for attaching the implement to the hand of the operator a strap 14 is fastened by the rivet 9 to the handpiece near the straight edge 6 thereof, said strap being provided with a terminal buckle 15, the tongue of which engages any one of a series of openings or apertures in the wrist-embracing strap 7. Secured to an intermediate portion of the strap 14 is one end of a thumb-strap 16, the opposite end of which is interposed between the handpiece 5 and plate 10 and is secured by the rivet 9′, as shown. It will thus be seen that the rivets not only serve to secure the plate to the handpiece, but also serve to retain the fastening-straps in position.

In using the device the operator grasps the ear at the top and then reaches out with the right hand and draws the same back, so that the hook pierces the husks, thus exposing the ear. When this is done, the fingers are in position to grasp the exposed ear, permitting the same to be easily detached from the husks. In detaching the binding-cords from bundles the hook is passed under or over the cord and the cutting edge of the hook brought in contact with the latter by moving the hand laterally, as before stated.

The device can be inexpensively manufactured and is admirably adapted for the attainments of the ends in view.

Having thus described the invention, what is claimed is—

1. A corn-husker comprising a plate, one end of which is slit longitudinally and bent rearwardly over the body of the plate to form a hook, the edge of the hook at its juncture with the body of the plate being sharpened to form a band-cutting knife, and means for attaching said plate to the hand.

2. A corn-husker comprising a pliable handpiece, and a plate secured to the handpiece and having one end thereof slit longitudinally and bent rearwardly over the body of the plate to form a hook, said hook having one edge thereof sharpened to form a band-cutting knife which extends from the smooth side edge of the bill of the hook to the juncture of the base of the latter with said plate.

3. A corn-husker comprising a pliable handpiece, a plate secured to the handpiece and having one end thereof slit longitudinally and bent rearwardly over the body of the plate to form a hook, said hook having one edge thereof sharpened to form a band-cutting knife, a wrist-embracing strap secured to one end of the plate, and a thumb-strap secured to the opposite end of said plate and fastened to the wrist-strap.

4. A corn-husker comprising a pliable handpiece, a longitudinally-bowed plate secured to the handpiece and having one end thereof slit longitudinally and thence bent rearwardly over the body of the plate, said hook at its juncture with the plate being sharpened to form a band-cutting knife, a wrist-embracing strap secured to one end of the plate, a thumb-strap secured to the opposite end of said plate and fastened to the thumb-strap, and a single rivet passing through the plate and handpiece at each end thereof and engaging the wrist and thumb straps, respectively.

In testimony that we claim the foregoing as our own we have hereto affixed our signatures in the presence of two witnesses.

GEORGE W. GOSS.
CHARLES E. GOSS.

Witnesses:
PEARL T. BELT,
H. C. BELT.